US009774688B2

(12) United States Patent
Tran et al.

(10) Patent No.: US 9,774,688 B2
(45) Date of Patent: Sep. 26, 2017

(54) DISCOVERY OF SERVER FUNCTIONS

(71) Applicant: salesforce.com, inc., San Francisco, CA (US)

(72) Inventors: Leo Duy Tran, San Francisco, CA (US); Samuel William Bailey, San Francisco, CA (US); James Bock Wunderlich, Burlingame, CA (US); Miguel Canizares, San Francisco, CA (US); Thomas Pollinger, San Mateo, CA (US); Elizabeth Balsam, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 171 days.

(21) Appl. No.: 14/709,765

(22) Filed: May 12, 2015

(65) Prior Publication Data

US 2016/0088095 A1  Mar. 24, 2016

Related U.S. Application Data

(60) Provisional application No. 62/052,014, filed on Sep. 18, 2014.

(51) Int. Cl.
*G06F 15/16* (2006.01)
*H04L 29/08* (2006.01)

(52) U.S. Cl.
CPC .............. *H04L 67/16* (2013.01); *H04L 67/10* (2013.01)

(58) Field of Classification Search
CPC ................. H04L 67/16; H04L 67/10
USPC ....................................................... 709/203
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,915,095 A * | 6/1999 | Miskowiec | G06F 9/5044 370/255 |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,304,894 B1 * | 10/2001 | Nakayama | H04L 67/42 709/202 |

(Continued)

*Primary Examiner* — Adnan Mirza
(74) *Attorney, Agent, or Firm* — Lowenstein Sandler LLP

(57) ABSTRACT

A request associated with a functions that are provided by a server may be received from a client system. A subset of the functions that are provided by the server and that are available based on the request may be identified. Information based on the identified subset of functions may be generated. Furthermore, the information that is based on the identified subset of functions may be transmitted to the client system.

20 Claims, 11 Drawing Sheets

(56) References Cited

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

* cited by examiner

DISCOVERY OF SERVER FUNCTIONS

RELATED APPLICATION

This patent application claims the benefit under 35 U.S.C. §119(e) of U.S. Provisional Application No. 62/052,014 filed Sep. 18, 2014, which is herein incorporated by reference.

TECHNICAL FIELD

Aspects of the disclosure generally relate to servers and, more specifically, relate to the discovery of server functions.

BACKGROUND

"Cloud computing" services provide shared resources, software, and information to computers and other devices upon request or on demand. Cloud computing typically involves the over-the-Internet provision of dynamically-scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
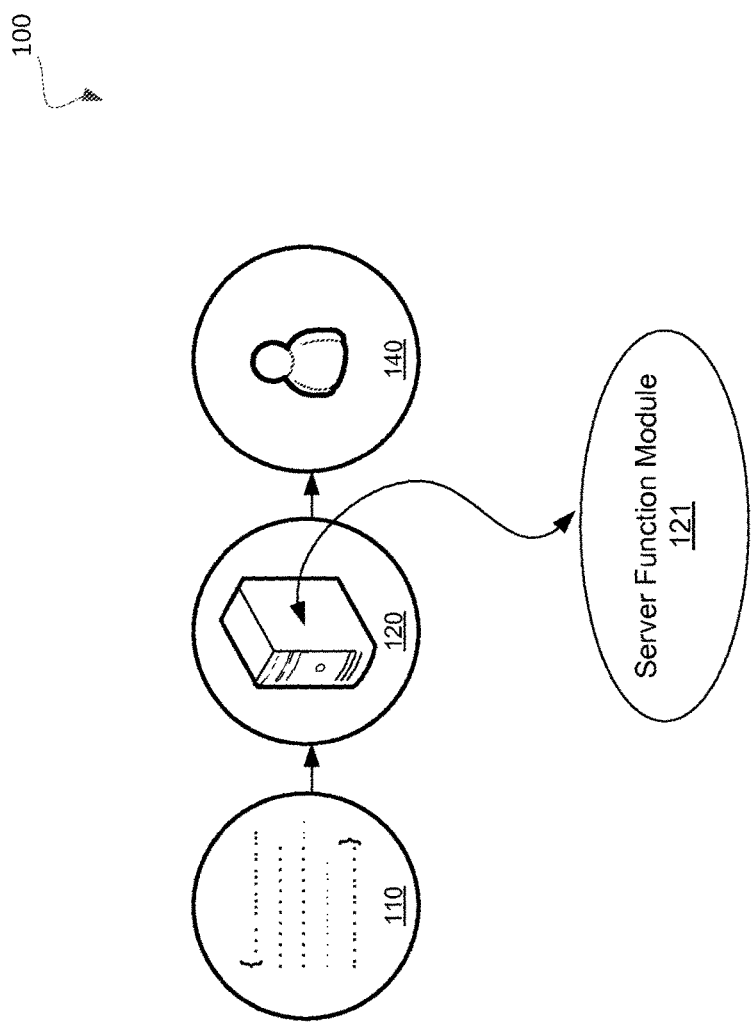
FIG. 1 illustrates an example environment using a server function module in accordance with some embodiments.

Aspects of the present disclosure are directed to the discovery of server functions. A server may provide multiple functions that may correspond to an action or performance of logic that is performed by the server. An application developer may use the functions that are provided by a server in a separate application. For example, the application developed by the application developer may invoke a function that is provided by the server by identifying a function and providing one or more input values for input attributes (e.g., a name-value pair). In response to the invocation of the function, the server may perform an action based on the received input values and may return an output value to the application developer. As an example, the application developer may include the invocation of the function as a command or instruction within the application that he or she has developed.

The functions, or actions, of the server may be defined by modular software components. For example, a first application developer may define a first function and a second application developer may define a second function. Each of the first function and the second function provided by the server may thus be separate modular pieces of software or logic provided to the server by different application developers. Furthermore, each of the first and second functions may be accessible to other application developers for use with other applications. Accordingly, a server may provide multiple functions where each of the functions may be invoked by multiple separate applications developed by separate application developers.

The server may thus provide multiple functions that may be invoked by various applications. Furthermore, the specific functions that are available from the server may change over time. For example, a software update (e.g., an operating system or other such update) of the server may add or remove functions that are available to be invoked. Furthermore, application developers may continue to add and/or remove functions that are provided by the server.

Since the server may include a large number of functions, a discovery query may be transmitted from a user of a client system (e.g., an application developer) to the server to identify the functions that are available and that may be invoked by the user of the client system. For example, in response to the discovery query, discovery information that identifies each function provided by the server that is available to the user of the client system may be generated and transmitted to the client system. Thus, an application developer may retrieve all of the available functions available to him or her without requiring the application developer to retrieve alternative documentation (e.g., a user manual or other such documentation) to identify the functions that are available to the application developer to include in his or her application and that are provided by the server.

As previously described, the discovery information may identify the available functions provided by the server.

Additional information regarding each of the functions may be provided to a user of the client system in response to a subsequent request. For example, the user of the client system may transmit selection information to the server that identifies one or more of the available functions. In response to receiving the selection information, the server may generate description information for each of the identified functions from the selection information. The description information may identify the inputs, outputs, and operation or behavior of each corresponding function from the selection information.

As an example, the user of a client system may transmit a discovery query to a server. In response to receiving the discovery query, the server may identify that one hundred functions are available to be provided by the server. The server may transmit discovery information to the user of the client system that identifies each of the one hundred available functions. In response to receiving the discovery information, the user of the client system may transmit selection information that identifies ten out of the one hundred functions. The server may subsequently generate description information for each of the ten functions. The description information may include information specifying inputs (e.g., values for inputs that are to be provided to invoke the function), outputs (e.g., a value provided by the server to the client system in response to an invocation of the function), and an operating description of the function. An application developer, or the user, of the client system may then obtain the information concerning the functions that are of interest to him or her and a description on how to use and invoke the function within his or her software application.

As previously described, the server may receive modular software components corresponding to the functions provided by the server from different application developers. The server may standardize particular features or aspects of the functions that are defined by the application developers. For example, the discovery information and description information for each function may be standardized by the server. Furthermore, the server may standardize other aspects or features of the functions such as error reporting, access permissions, etc.

Accordingly, the discovery of functions provided by a server may facilitate the use of functions that are defined by multiple users (e.g., application developers). Another user may identify the functions that are provided by the server and obtain information on how particular functions operate and how the user may use the functions within his or her own application. Furthermore, since the functions may be invoked by a client system transmitting input values (e.g., an application on a client system transmitting one or more name-value pairs), then the application may invoke the functions without significant added logic or code within the application. As a result, the server that provides the functions may allow the use of the functions by multiple applications without the writing of custom logic or code to invoke the customs by each application developer.

I. Discovery of Server Functions

FIG. 1 illustrates an example environment 100 using a server function module. In general, the environment 100 may include a server 120 with a server function module 121 that receives functions defined by users of client systems 110, standardizes the functions, and provides the functions to be used or invoked by users of applications associated with other client systems 130.

As shown in FIG. 1, the environment 100 may include a server 120 that includes a server function module 121. The server 120 may be coupled to the client systems 110 and the other client systems 130 via a network. In some embodiments, the network may be a public network (e.g., the Internet), a private network (e.g., a local area network (LAN) or wide area network (WAN)), or a combination thereof. The network may include a wireless infrastructure, which may be provided by one or multiple wireless communications systems, such as a wireless fidelity (WiFi) hotspot connected with the network and/or a wireless carrier system that can be implemented using various data processing equipment, communication towers, etc. Furthermore, the client systems 110, server 120, and other client systems 130 may include, but are not limited to, desktop computers, laptop computers, rackmount servers, routers, switches, tablet computers, mobile phones, or any other type of computing device.

The users of the client systems 110 may provide definitions (e.g., modular software components) for functions that are to be provided by the server 120. For example, the definitions may define actions that are to be performed or executed by the server 120 in response to at least one of applications associated with one of the other client systems 130 invoking the corresponding function.

As an example, one of the client systems 110 may provide a definition for a particular function that is to be standardized and provided by the server 120. An application developer associated with one of the other client systems 130 may subsequently transmit a discovery query to the server 120 for discovery information that identifies the available functions provided by the server. In response to the discovery query, the server 120 may generate discovery information that identifies the particular function among other functions that were previously provided by one of the client systems 110. Subsequently, the application developer associated with one of the other client systems 130 may transmit selection information identifying the particular function. In response, the server 120 may transmit description information of the particular function to the application developer associated with the other client system 130. Thus, the application developer may obtain information regarding how to use the particular function (e.g., the required inputs and the returned output) and its operation. Subsequently, the application developer may include programming code in an application that utilizes the invocation of the particular function.

Figure 2:
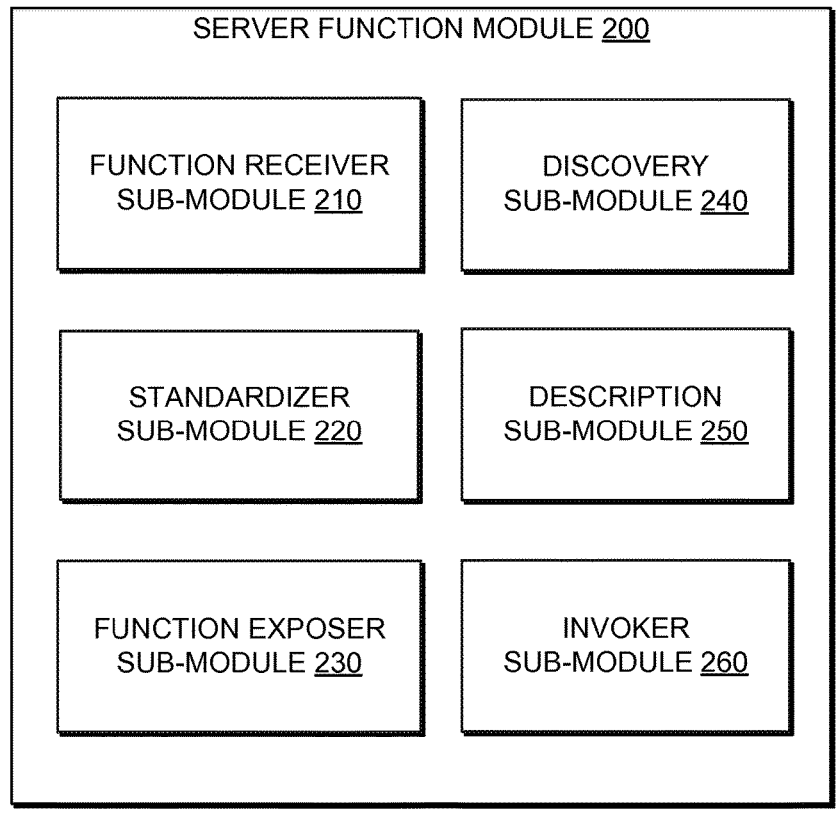
FIG. 2 is a block diagram of an example server function module in accordance with some embodiments of the present disclosure.

FIG. 2 is a block diagram of an example server function module 200. In general, the server function module 200 may correspond to the server function module 121 of FIG. 1. The server function module 200 may include a function receiver sub-module 210, a standardizer sub-module 220, a function exposer sub-module 230, a discovery sub-module 240, a description sub-module 250, and an invoker sub-module 260. In alternative embodiments, the functionality of one or more of the sub-modules may be combined or divided.

As shown in FIG. 2, the server function module 200 may include a function receiver sub-module 210 that may receive definitions of functions from multiple client systems. For example, different definitions for different functions from different users (e.g., application developers) of client systems may be received. The standardizer sub-module 220 may standardize the different functions that have been received by a server. For example, aspects or features of the received functions may be standardized. Further details with regard to the standardizing of functions are described in conjunction with FIG. 7. The function exposer module 230 may expose, or make available to client systems, the received functions that have been standardized. For example, the exposing of a function may allow the function to be invoked by another client system. In some embodiments, the exposing of the function may identify the function in response to a discovery query. The discovery sub-module 240 may identify functions that are available to be provided by the server and may generate discovery information based on the identified functions. For example, the discovery sub-module 240 may identify particular functions that are available by the server in response to a discovery query from a user of a client system and may transmit the discovery information to the user of the client system. Furthermore, the description sub-module 250 may generate description information of one or more functions that are provided by the server. Further details with regard to the generation of discovery information and description information are described in conjunction with FIGS. 4-6.

Furthermore, the server function module 200 may include an invoker sub-module 260 that may invoke one or more functions. For example, the invoker sub-module 260 may invoke a function in response to an invocation request from a client system that specifies one or more input values (e.g., name-value pairs) for a particular function.

Figure 3:
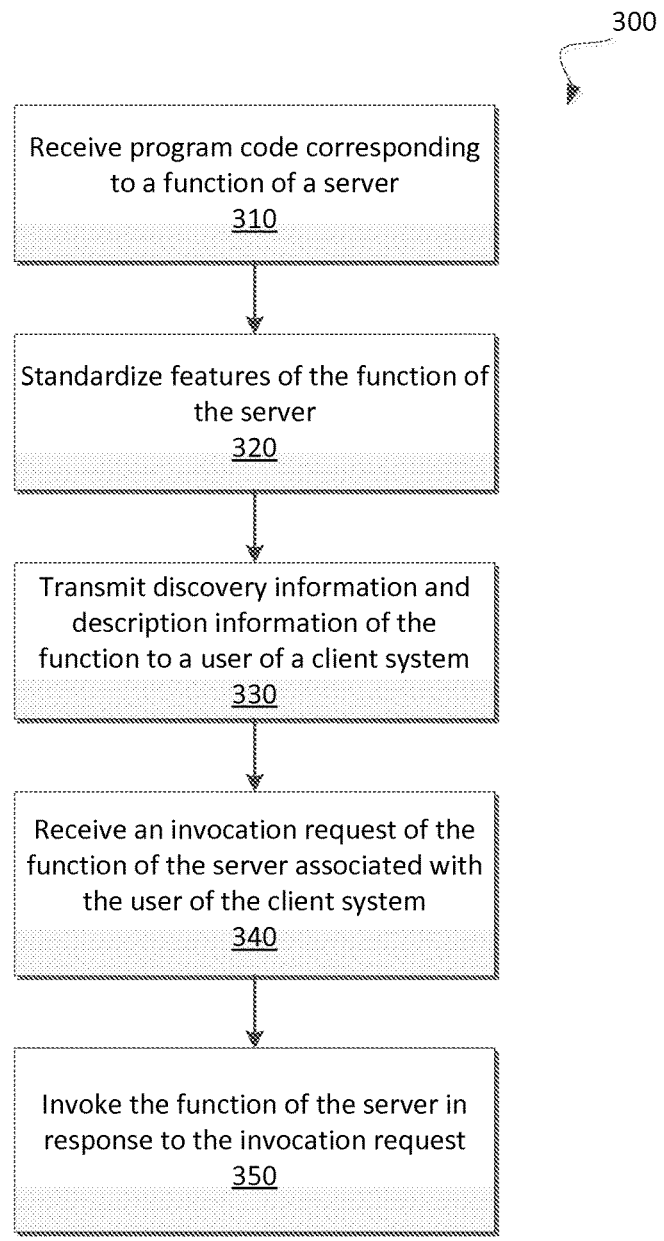
FIG. 3 is a flow diagram of an example method to provide a function of a server in accordance with some embodiments.

FIG. 3 is a flow diagram of an example method 300 to provide a function of a server. In general, the method 300 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the server function module 121 or 200 of FIG. 1 or 2 may perform the method 300.

As shown in FIG. 3, the method 300 may begin with the processing logic receiving program code corresponding to a function of a server (block 310). The program code may define one or more actions to be performed by the server in response to a subsequent invocation of the function. The processing logic may further standardize features of the function (block 320). For example, an error message that may be returned by the function, organization of description information of the function, and so forth may be standardized to be similar to other functions that were previously received by the server. Further details with regard to the standardization of functions are disclosed in conjunction with FIG. 7. The processing logic may further transmit discovery information that identifies the function and description information that describes an operation of the function to a user of a client system (block 330). For example, the discovery information and the description information may be transmitted to the user of a client system that has transmitted a discovery request to the server. Furthermore, the processing logic may receive an invocation request of the function of the server (block 340). For example, the invocation request may identify the function as well input values for attributes of the function (e.g., name-value pairs). In response to receiving the invocation request including the one or more input values for the attributes of the identified function, the processing logic may invoke the function (block 350). For example, the server may perform the actions defined by the previously received program code corresponding to the function. Furthermore, one or more values may be returned to the user of the client system. In some embodiments, the function may be invoked based on a bulk invocation request. For example, the invocation request may identify multiple functions where each of the functions may then be invoked in response to a single invocation request.

As an example, a first user (e.g., a first application developer of a first client system) may provide program code corresponding to a function. The program code may specify that the server is to perform an action associated with transmitting an email message of a particular service. Thus, the function may be considered an email function that is provided by the server. The program code may specify a first input value corresponding to a recipient email address and a second input value corresponding to content of an email. The server may standardize particular features of the email function. For example, a standard error message may be provided for the email function. The standard error message may be returned to a client system that has invoked the email function when either the first input value or the second input value provided by the client system does not meet requirements of the email function (e.g., the recipient address is invalid). After the standardizing of the email function, the server may allow other users to discover and invoke the email function. For example, a second user may transmit a discovery query to the server and may receive discovery information that identifies that the email function is provided by the server. The second user may subsequently decide to obtain additional information for the email function. As such, the second user may transmit selection information that identifies the email function. The server may then generate description information for the email function and may transmit the description information to the second user. Thus, the second user may obtain information on the operation of the email function. The second user may then provide an invocation of the email function within an application that the second user is developing.

Figure 4:
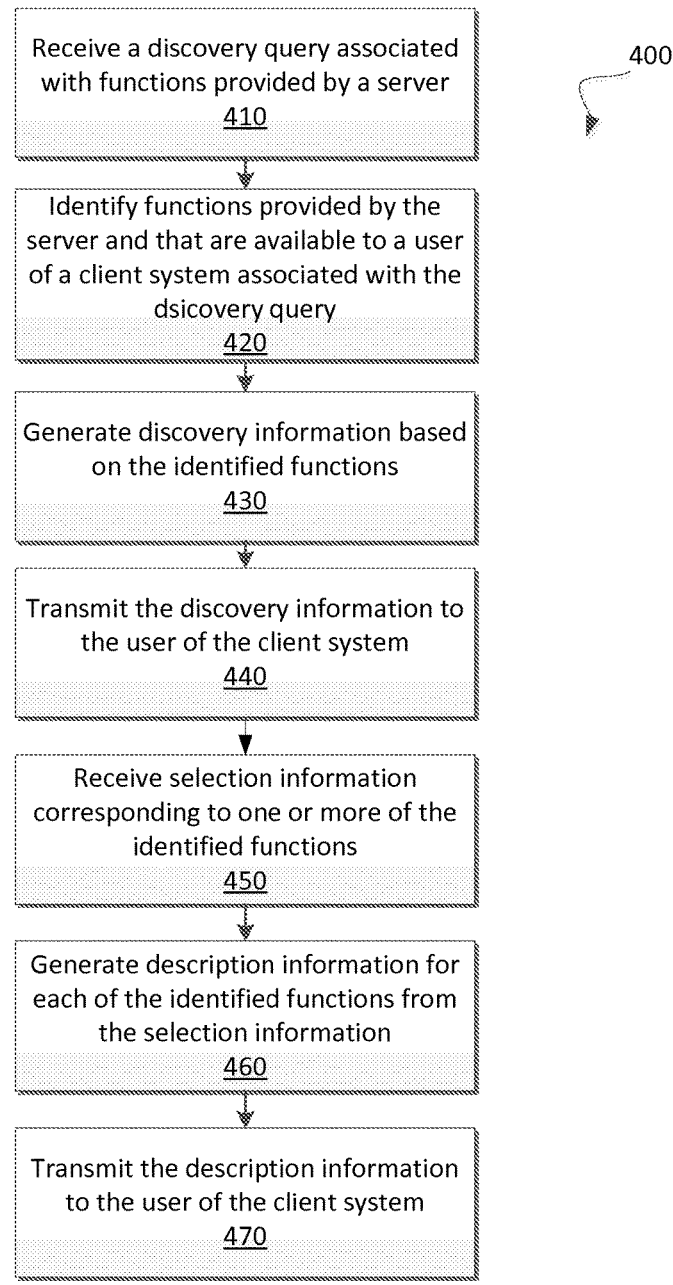
FIG. 4 is a flow diagram of an example method to transmit discovery information and description information associated with functions of a server in accordance with some embodiments.

FIG. 4 is a flow diagram of an example method 400 to transmit discovery information and description information associated with functions of a server. In general, the method 400 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the server function module 121 or 200 of FIG. 1 or 2 may perform the method 400.

As shown in FIG. 4, the method 400 may begin with the processing logic receiving, from a client system, a discovery query associated with functions provided by a server (block 410). The processing logic may further identify functions that are provided by the server and that are available to a user of the client system (block 420). In some embodiments, the functions may be all functions that are currently provided by the server. In alternative embodiments, the functions that are identified may be a portion of the functions that are provided by the server. For example, the user of the client system may be associated with access permissions that specify specific functions that may be discovered by the client system and/or invoked by the client system (or an application provided by the client system). The access permissions may specify that the client system is authorized to invoke a particular function. Further details with regard to access permissions are described in conjunction with FIG. 5.

The processing logic may further generate discovery information based on the identified functions (block 430). The discovery information may provide a list of the functions that are available to the client system. For example, the discovery information may aggregation of identification of each of the functions provided by the server that are available to the user of the client system. For example, the discovery information may list a name corresponding to each of the identified functions. In the same or alternative embodiments, the discovery information may list a name, one or more input values, and one or more returned output values corresponding to each of the identified functions. The processing logic may then transmit the discovery information to the client system (block 440).

Referring to FIG. 4, the processing logic may receive selection information corresponding to one or more of the identified functions (block 450). For example, a server may receive selection information that identifies a portion of identified functions that are provided by the server and are available to the client system as identified from the previously transmitted discovery information. The processing logic may subsequently generate description information for each of the identified functions from the selection information (block 460). In some embodiments, the description information may be an aggregation of information associated with each of the identified functions. For example, the aggregated description information may identify inputs for each function, outputs of each function, and a description of the operation of each function in a single data structure. The operation of a function may specify how one or more inputs of the function are used to generate the output of the corresponding function. In some embodiments, the description information may be returned in a structured format. For example, the structured format for each description corresponding toe ach function may be in the same format or order. As an example, the description information may first identify the name of the function, then the inputs for the function as well as requirements of the input (e.g., value types), a description of the output of the function (e.g., the type of value that is returned in response to the invoking of the function), and then a description of the operation of the function. The processing logic may then transmit the description information to the client system (block 470). For example, the aggregated information of each of the identified functions may be transmitted to the user of the client system.

Figure 5:
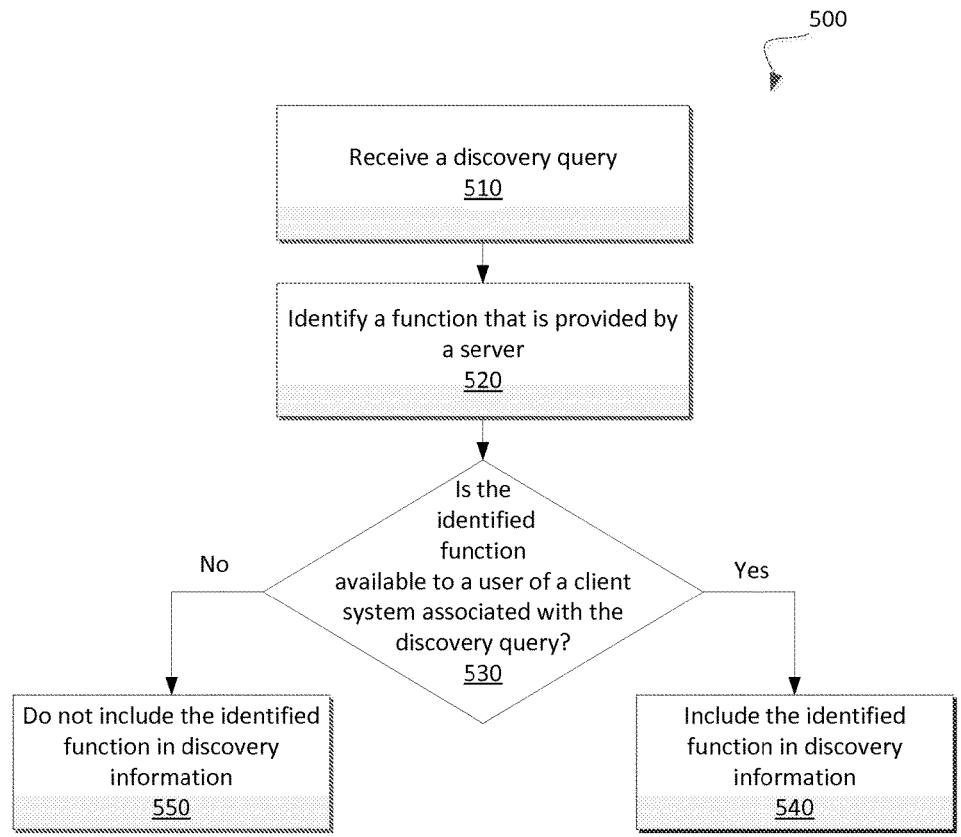
FIG. 5 is a flow diagram of an example method to determine to include or not to include a function of a server in discovery information in accordance with some embodiments.

FIG. 5 is a flow diagram of an example method 500 to determine to include or not to include a function of a server in discovery information. In general, the method 500 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the server function module 121 or 200 of FIG. 1 or 2 may perform the method 500.

As shown in FIG. 5, the method 500 may begin with the processing logic receiving a discovery query (block 510). For example, a server may receive the discovery query from a user of a client system. The processing logic may identify a function that is provided by the server (block 520). For example, the server may identify a first function from multiple functions that are provided by the server. Furthermore, the processing logic may determine if the identified function is available to a user of a client system associated with the discovery query (block 530). For example, the identified function may be associated with access permissions that specify particular client systems or users of the client system that have access to use the identified function. If the processing logic determines that the function is available to the user of the client system, then the identified function may be included in discovery information (block 540). For example, the identified function may be included with other functions that are provided by a server and that are available to the user of the client system. However, if the processing logic determines that the function is not available to the user of the client system, then the identified function may not be included in the discovery information (block 550). For example, the identified function may not be included with other functions that are provided by the server and that are available to the user of the client system.

As such, the access permissions for a function may specify a condition associated with users who may access the function. For example, the condition for the function may specify that a user may be in a list of users or a list of groups that include the user in order to invoke the function or to receive the function in discovery information that is returned in response to a discovery query. Alternatively the access permissions may be associated with a client system or a user of a client system. For example, the access permissions of the user of the client system may specify particular functions that are available to the user.

In some embodiments, the access permissions may identify particular users that have access to a particular function or which functions a particular user may access. For example, access permissions of a user may identify that the user may discover and/or invoke a first function and a second function but may not discover and/or invoke a third function. The user may transmit a discovery query to the server that provides the first, second, and third functions. Since the user does not have access permissions for the third function, the discovery information generated in response to the discovery query from the user may identify the first function and the second function while the third function is not included in the discovery information.

Figure 6:
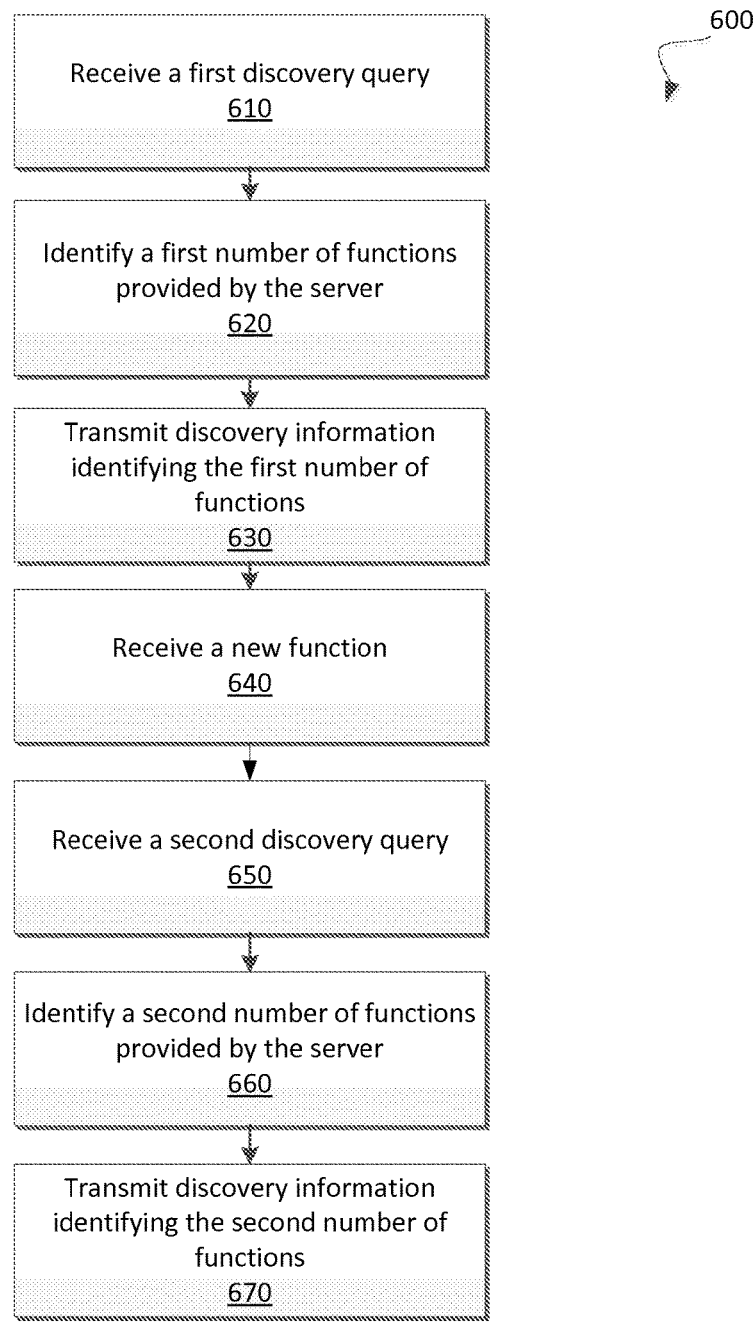
FIG. 6 is a flow diagram of an example method to provide new discovery information based on a new function of a server being provided in accordance with some embodiments.

FIG. 6 is a flow diagram of an example method 600 to provide new discovery information based on a new function of a server being provided. In general, the method 600 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the server function module 121 or 200 of FIG. 1 or 2 may perform the method 600.

As shown in FIG. 6, the method 600 may begin with the processing logic receiving a first discovery query (block 610). For example, the first discovery query may be received by a server from a user of a client system at a first time. The processing logic may identify a first number of functions that are provided by the server and that are available (block 620). For example, a first number of functions may be identified in response to the first discovery query. In some embodiments, the first number of functions may correspond to a subset of functions that are provided by the server. For example, the server may provide a set of functions and the first number of functions may correspond to a subset or a portion of the set of functions. The processing logic may subsequently transmit discovery information identifying the first number of functions (block 630). For example, the discovery information may be generated based on the first number of functions and then transmitted to the user of the client system. Subsequently, the processing logic may receive a new function (block 640). For example, a user of another client system may provide a software module that defines actions associated with a function that are to be provided by the server in response to an invocation of the function. In some embodiments, features of the function may be standardized by the server as described in further detail with regard to FIG. 7.

At a second time, the processing logic may receive a second discovery query (block 650). For example, the second discovery query may be received by the server after the server has received the first discovery query and after the server has received the new function. The processing logic may identify a second number (i.e., a second subset) of functions that are provided by the server (block 660). In some embodiments, the second number of functions may be identified in response to the second discovery query. In the same or alternative embodiments, the second number of functions may identify the first number of functions and the new function that has been received by the server as well as standardized by the server. Thus, the second number of functions may identify more functions than the first number of functions. The processing logic may subsequently transmit second discovery information identifying the second number of functions (block 670). The second discovery information may be based on the second number of functions. Furthermore, the second discovery information may be transmitted to the user of the client system in response to the second discovery query.

As such, the server may provide discovery information that identifies functions that are dynamically added (or removed) so that the discovery information that is provided to the client system is updated as functions are added or removed from the server. For example, a first software update of the server may provide the first number of functions and a second software update after the first software update may provide additional functions in addition to the functions that were provided by the first software update. The discovery information may be updated to identify the additional functions that are now available after the second software update to the server. Alternatively, the second software update of the server may remove a function that was previously provided by the first software update. The discovery information may then be updated to identify fewer functions that are now available after the second software update. For example, the removed function may no longer be identified.

Figure 7:
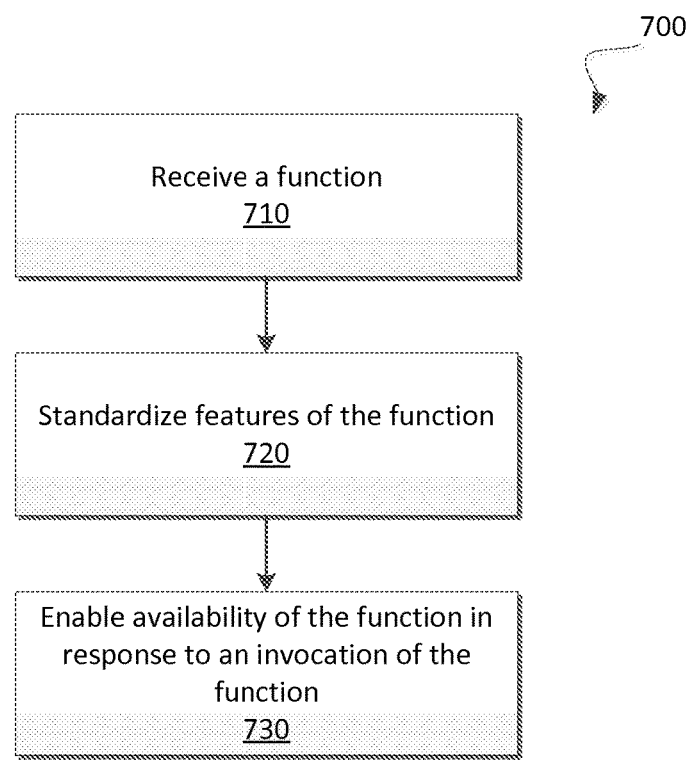
FIG. 7 is a flow diagram of an example method to provide a standardized function of a server in accordance with some embodiments.

FIG. 7 is a flow diagram of an example method 700 to provide a standardized function of a server. In general, the method 700 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the server function module 121 or 200 of FIG. 1 or 2 may perform the method 700.

As shown in FIG. 7, the method 700 may begin with the processing logic receiving a function (block 710). For example, the function may correspond to a software module that includes actions that are to be performed by the server when the function is invoked by a client system. Thus, the function may be a piece of logic that performs an action by the server. The processing logic may further standardize features of the function (block 720). For example, an error reporting feature of the function may be standardized to be similar to error reporting features of other functions. In some embodiments, an error message that is returned in response to an invoked function not being performed by the server may be similar for multiple functions. For example, if an input value for a first function is incorrect, then the same error message may be returned to the user of a client system invoking the first function as would be for an input value for a second function being incorrect. Other features of the functions may be also be standardized. For example, access permissions for functions may be standardized. In some embodiments, the access permissions for the functions may be specified based on groups of users as opposed to specific users. For example, access permissions for a first function may be defined based on a first group of users and a second group of users while access permissions for a second function may also be defined based on the same groups of users.

Furthermore, the processing logic may provide the function for invocation (block 730). For example, the function may be provided or made available by the server to be invoked by another client system in response or after the function has been standardized by the server.

II. Example System Overview

Figure 8A:
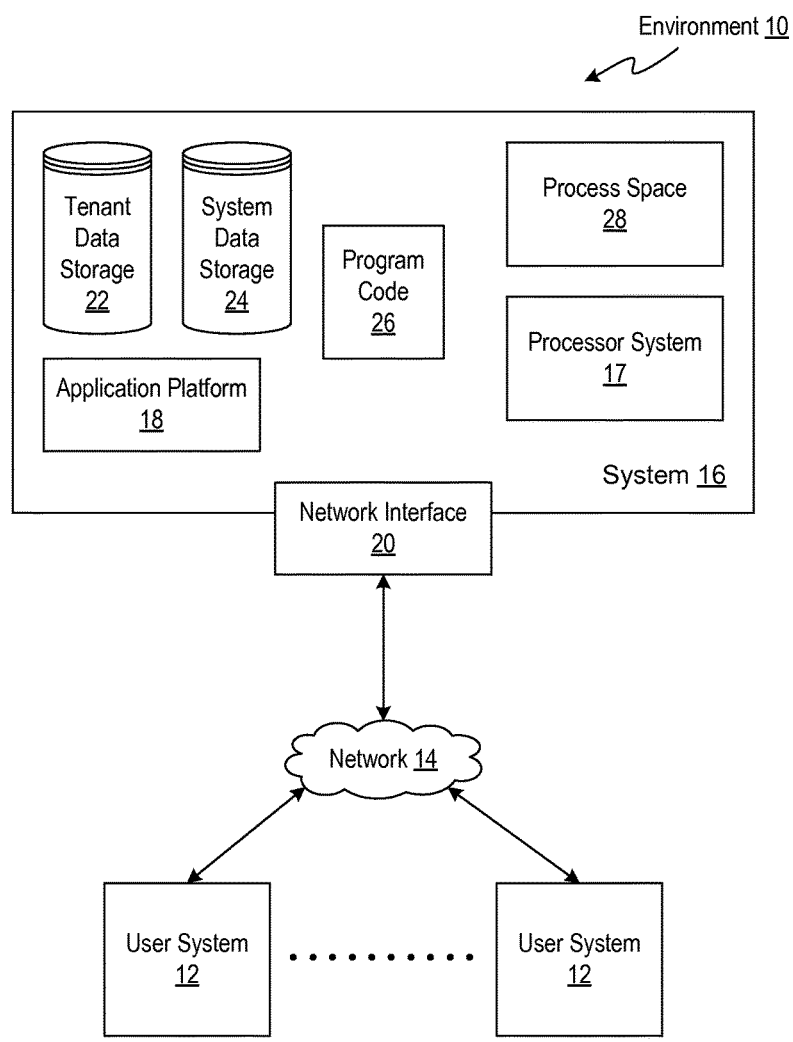
FIG. 8A shows a block diagram of an example environment in which an on-demand database service can be used in accordance with some embodiments.

FIG. 8A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 8B:
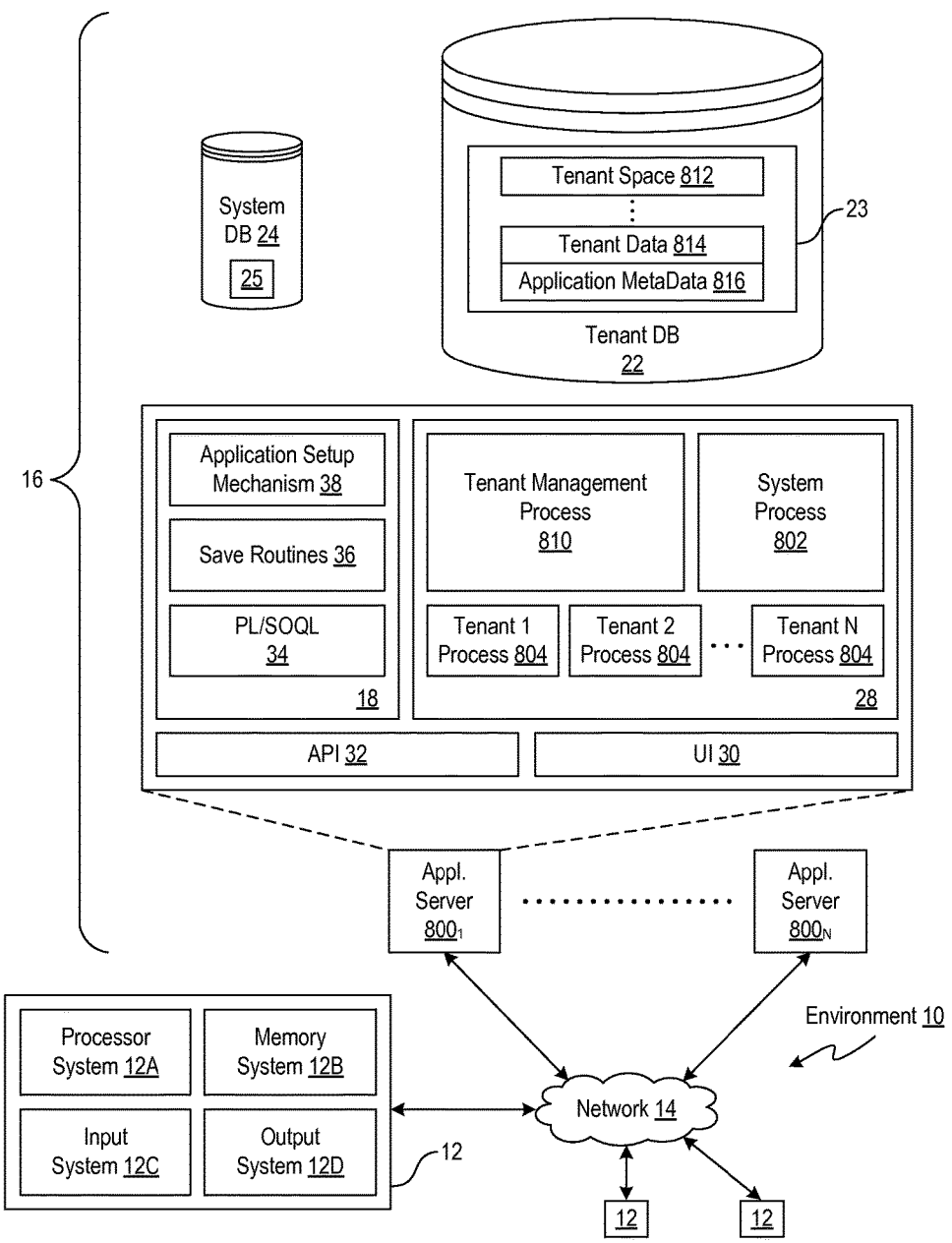
FIG. 8B shows a block diagram of example implementations of elements of FIG. 1A and example interconnections between these elements according to some embodiments.

FIG. 8B shows a block diagram of example implementations of elements of FIG. 8A and example interconnections between these elements according to some implementations. That is, FIG. 8B also illustrates environment 10, but FIG. 8B, various elements of the system 16 and various interconnections between such elements are shown with more specificity according to some more specific implementations. Additionally, in FIG. 8B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 8B, the network interface 20 is implemented as a set of HTTP application servers $100_1$-$100_N$. Each application server 800, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 812, which can be physically or logically arranged or divided. Within each tenant storage space 812, user storage 814 and application metadata 816 can similarly be allocated for each user. For example, a copy of a user's most recently used (MRU) items can be stored to user storage 814. Similarly, a copy of MRU items for an entire organization that is a tenant can be stored to tenant storage space 812.

The process space 28 includes system process space 802, individual tenant process spaces 804 and a tenant management process space 810. The application platform 18 includes an application setup mechanism 38 that supports application developers' creation and management of applications. Such applications and others can be saved as metadata into tenant database 22 by save routines 36 for execution by subscribers as one or more tenant process spaces 804 managed by tenant management process 810, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 16 of FIG. 8B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 800 can be communicably coupled with tenant database 22 and system database 24, for example, having access to tenant data 23 and system data 25, respectively, via a different network connection. For example, one application server $800_1$ can be coupled via the network 14 (for example, the Internet), another application server $800_{N-1}$ can be coupled via a direct network link, and another application server $800_N$ can be coupled by yet a different network connection. Transfer Control Protocol and Internet Protocol (TCP/IP) are examples of typical protocols that can be used for communicating between application servers 800 and the system 16. However, it will be apparent to one skilled in the art that other transport protocols can be used to optimize the system 16 depending on the network interconnections used.

In some implementations, each application server 800 is configured to handle requests for any user associated with any organization that is a tenant of the system 16. Because it can be desirable to be able to add and remove application servers 800 from the server pool at any time and for various reasons, in some implementations there is no server affinity for a user or organization to a specific application server 800. In some such implementations, an interface system implementing a load balancing function (for example, an F5 Big-IP load balancer) is communicably coupled between the application servers 800 and the user systems 12 to distribute requests to the application servers 800. In one implementation, the load balancer uses a least-connections algorithm to route user requests to the application servers 800. Other examples of load balancing algorithms, such as round robin and observed-response-time, also can be used. For example, in some instances, three consecutive requests from the same user could hit three different application servers 800, and three requests from different users could hit the same application server 800. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 800 to request and update system-level and tenant-level data from the system 16. Such requests and updates can involve sending one or more queries to tenant database 22 or system database 24. The system 16 (for example, an application server 800 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
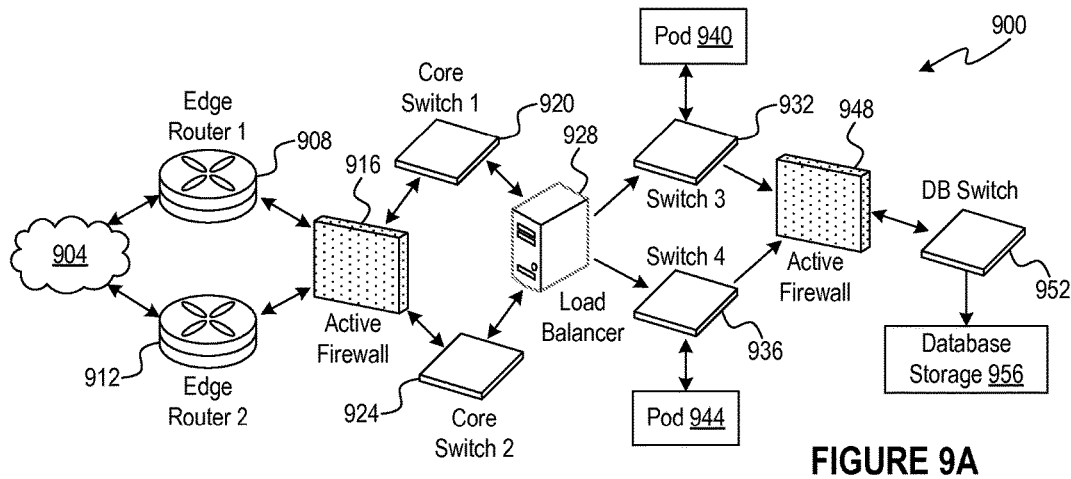
FIG. 9A shows a system diagram of example architectural components of an on-demand database service environment according to some embodiments.

FIG. 9A shows a system diagram illustrating example architectural components of an on-demand database service environment 900 according to some implementations. A client machine communicably connected with the cloud 904, generally referring to one or more networks in combination, as described herein, can communicate with the on-demand database service environment 900 via one or more edge routers 908 and 912. A client machine can be any of the examples of user systems 12 described above. The edge routers can communicate with one or more core switches 920 and 924 through a firewall 916. The core switches can communicate with a load balancer 928, which can distribute server load over different pods, such as the pods 940 and 944. The pods 940 and 944, which can each include one or more servers or other computing resources, can perform data processing and other operations used to provide on-demand services. Communication with the pods can be conducted via pod switches 932 and 936. Components of the on-demand database service environment can communicate with database storage 956 through a database firewall 948 and a database switch 952.

Figure 9B:
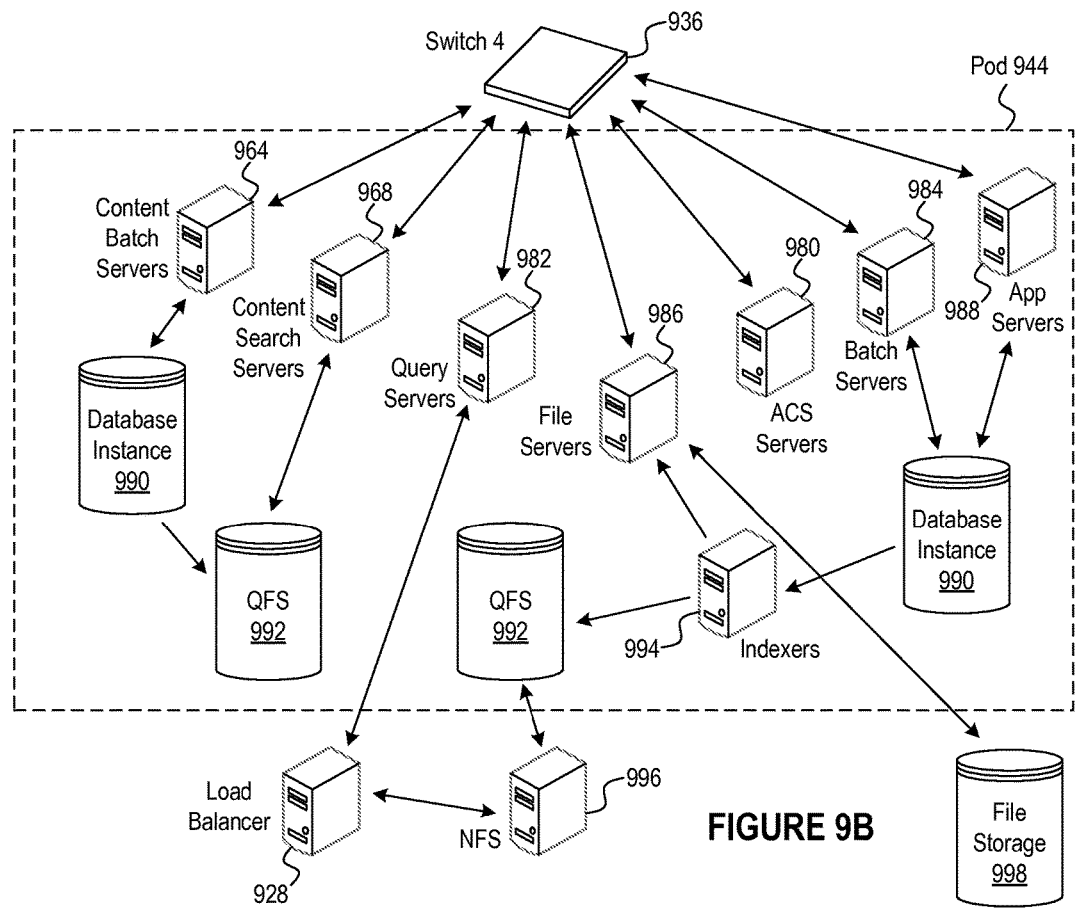
FIG. 9B shows a system diagram further illustrating example architectural components of an on-demand database service environment according to some embodiments.

As shown in FIGS. 9A and 9B, accessing an on-demand database service environment can involve communications transmitted among a variety of different hardware or software components. Further, the on-demand database service environment 900 is a simplified representation of an actual on-demand database service environment. For example, while only one or two devices of each type are shown in FIGS. 9A and 9B, some implementations of an on-demand database service environment can include anywhere from one to several devices of each type. Also, the on-demand database service environment need not include each device shown in FIGS. 9A and 9B, or can include additional devices not shown in FIGS. 9A and 9B.

Additionally, it should be appreciated that one or more of the devices in the on-demand database service environment 900 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 904 is intended to refer to a data network or multiple data networks, often including the Internet. Client machines communicably connected with the cloud 904 can communicate with other components of the on-demand database service environment 900 to access services provided by the on-demand database service environment. For example, client machines can access the on-demand database service environment to retrieve, store, edit, or process information. In some implementations, the edge routers 908 and 912 route packets between the cloud 904 and other components of the on-demand database service environment 900. For example, the edge routers 908 and 912 can employ the Border Gateway Protocol (BGP). The BGP is the core routing protocol of the Internet. The edge routers 908 and 912 can maintain a table of IP networks or 'prefixes', which designate network reachability among autonomous systems on the Internet.

In some implementations, the firewall 916 can protect the inner components of the on-demand database service environment 900 from Internet traffic. The firewall 916 can block, permit, or deny access to the inner components of the on-demand database service environment 900 based upon a set of rules and other criteria. The firewall 916 can act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 can be configured as network bridges that quickly route data between different components within the on-demand database service environment. In some implementations, the use of two or more core switches 920 and 924 can provide redundancy or reduced latency.

In some implementations, the pods 940 and 944 perform the core data processing and service functions provided by the on-demand database service environment. Each pod can include various types of hardware or software computing resources. An example of the pod architecture is discussed in greater detail with reference to FIG. 9B. In some implementations, communication between the pods 940 and 944 is conducted via the pod switches 932 and 936. The pod switches 932 and 936 can facilitate communication between the pods 940 and 944 and client machines communicably connected with the cloud 904, for example via core switches 920 and 924. Also, the pod switches 932 and 936 may facilitate communication between the pods 940 and 944 and the database storage 956. In some implementations, the load balancer 928 can distribute workload between the pods 940 and 944. Balancing the on-demand service requests between the pods can assist in improving the use of resources, increasing throughput, reducing response times, or reducing overhead. The load balancer 928 may include multilayer switches to analyze and forward traffic.

In some implementations, access to the database storage 956 is guarded by a database firewall 948. The database firewall 948 can act as a computer application firewall operating at the database application layer of a protocol stack. The database firewall 948 can protect the database storage 956 from application attacks such as structure query language (SQL) injection, database rootkits, and unauthorized information disclosure. In some implementations, the database firewall 948 includes a host using one or more forms of reverse proxy services to proxy traffic before passing it to a gateway router. The database firewall 948 can inspect the contents of database traffic and block certain content or database requests. The database firewall 948 can work on the SQL application level atop the TCP/IP stack, managing applications' connection to the database or SQL management interfaces as well as intercepting and enforcing packets traveling to or from a database network or application interface.

In some implementations, communication with the database storage 956 is conducted via the database switch 952. The multi-tenant database storage 956 can include more than one hardware or software components for handling database queries. Accordingly, the database switch 952 can direct database queries transmitted by other components of the on-demand database service environment (for example, the pods 940 and 944) to the correct components within the database storage 956. In some implementations, the database storage 956 is an on-demand database system shared by many different organizations as described above with reference to FIGS. 8A and 8B.

FIG. 9B shows a system diagram further illustrating example architectural components of an on-demand database service environment according to some implementations. The pod 944 can be used to render services to a user of the on-demand database service environment 900. In some implementations, each pod includes a variety of servers or other systems. The pod 944 includes one or more content batch servers 964, content search servers 968, query servers 982, file force servers 986, access control system (ACS) servers 980, batch servers 984, and app servers 988. The pod 944 also can include database instances 990, quick file systems (QFS) 992, and indexers 994. In some implementations, some or all communication between the servers in the pod 944 can be transmitted via the switch 936.

In some implementations, the app servers 988 include a hardware or software framework dedicated to the execution of procedures (for example, programs, routines, scripts) for supporting the construction of applications provided by the on-demand database service environment 900 via the pod 944. In some implementations, the hardware or software framework of an app server 988 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 964 can handle requests internal to the pod. Some such requests can be long-running or not tied to a particular customer. For example, the content batch servers 964 can handle requests related to log mining, cleanup work, and maintenance tasks. The content search servers 968 can provide query and indexer functions. For example, the functions provided by the content search servers 968 can allow users to search through content stored in the on-demand database service environment. The file force servers 986 can manage requests for information stored in the File force storage 998. The File force storage 998 can store information such as documents, images, and basic large objects (BLOBs). By managing requests for information using the file force servers 986, the image footprint on the database can be reduced. The query servers 982 can be used to retrieve information from one or more file systems. For example, the query system 982 can receive requests for information from the app servers 988 and transmit information queries to the NFS 996 located outside the pod.

The pod 944 can share a database instance 990 configured as a multi-tenant environment in which different organizations share access to the same database. Additionally, services rendered by the pod 944 may call upon various hardware or software resources. In some implementations, the ACS servers 980 control access to data, hardware resources, or software resources. In some implementations, the batch servers 984 process batch jobs, which are used to run tasks at specified times. For example, the batch servers 984 can transmit instructions to other servers, such as the app servers 988, to trigger the batch jobs.

In some implementations, the QFS 992 is an open source file system available from Sun Microsystems® of Santa Clara, Calif. The QFS can serve as a rapid-access file system for storing and accessing information available within the pod 944. The QFS 992 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 968 or indexers 994 to identify, retrieve, move, or update data stored in the network file systems 996 or other storage systems.

In some implementations, one or more query servers 982 communicate with the NFS 996 to retrieve or update information stored outside of the pod 944. The NFS 996 can allow servers located in the pod 944 to access information to access files over a network in a manner similar to how local storage is accessed. In some implementations, queries from the query servers 982 are transmitted to the NFS 996 via the load balancer 928, which can distribute resource requests over various resources available in the on-demand database service environment. The NFS 996 also can communicate with the QFS 992 to update the information stored on the NFS 996 or to provide information to the QFS 992 for use by servers located within the pod 944.

In some implementations, the pod includes one or more database instances 990. The database instance 990 can transmit information to the QFS 992. When information is transmitted to the QFS, it can be available for use by servers within the pod 944 without using an additional database call. In some implementations, database information is transmitted to the indexer 994. Indexer 994 can provide an index of information available in the database 990 or QFS 992. The index information can be provided to file force servers 986 or the QFS 992.

III. Enterprise Social Networking

As initially described above, in some implementations, some of the methods, processes, devices and systems described herein can implement, or be used in the context of, enterprise social networking. Some online enterprise social networks can be implemented in various settings, including businesses, organizations and other enterprises (all of which are used interchangeably herein). For instance, an online enterprise social network can be implemented to connect users within a business corporation, partnership or organization, or a group of users within such an enterprise. For instance, Chatter® can be used by users who are employees in a business organization to share data, communicate, and collaborate with each other for various enterprise-related purposes. Some of the disclosed methods, processes, devices, systems and computer-readable storage media described herein can be configured or designed for use in a multi-tenant database environment, such as described above with respect to system 16. In an example implementation, each organization or a group within the organization can be a respective tenant of the system.

In some implementations, each user of the database system 16 is associated with a "user profile." A user profile refers generally to a collection of data about a given user. The data can include general information, such as a name, a title, a phone number, a photo, a biographical summary, or a status (for example, text describing what the user is currently doing, thinking or expressing). As described below, the data can include messages created by other users. In implementations in which there are multiple tenants, a user is typically associated with a particular tenant (or "organization"). For example, a user could be a salesperson of an organization that is a tenant of the database system 16.

A "group" generally refers to a collection of users within an organization. In some implementations, a group can be defined as users with the same or a similar attribute, or by membership or subscription. Groups can have various visibilities to users within an enterprise social network. For example, some groups can be private while others can be public. In some implementations, to become a member within a private group, and to have the capability to publish and view feed items on the group's group feed, a user must request to be subscribed to the group (and be accepted by, for example, an administrator or owner of the group), be invited to subscribe to the group (and accept), or be directly subscribed to the group (for example, by an administrator or owner of the group). In some implementations, any user within the enterprise social network can subscribe to or follow a public group (and thus become a "member" of the public group) within the enterprise social network.

A "record" generally refers to a data entity, such as an instance of a data object created by a user or group of users of the database system 16. Such records can include, for example, data objects representing and maintaining data for accounts, cases, opportunities, leads, files, documents, orders, pricebooks, products, solutions, reports and forecasts, among other possibilities. For example, a record can be for a business partner or potential business partner (for example, a client, vendor, distributor, etc.) of a user or a user's organization, and can include information describing an entire enterprise, subsidiaries of an enterprise, or contacts at the enterprise. As another example, a record can be a project that a user or group of users is/are working on, such as an opportunity (for example, a possible sale) with an existing partner, or a project that the user is trying to obtain. A record has data fields that are defined by the structure of the object (for example, fields of certain data types and purposes). A record also can have custom fields defined by a user or organization. A field can include (or include a link to) another record, thereby providing a parent-child relationship between the records.

Records also can have various visibilities to users within an enterprise social network. For example, some records can be private while others can be public. In some implementations, to access a private record, and to have the capability to publish and view feed items on the record's record feed, a user must request to be subscribed to the record (and be accepted by, for example, an administrator or owner of the record), be invited to subscribe to the record (and accept), be directly subscribed to the record or be shared the record (for example, by an administrator or owner of the record). In some implementations, any user within the enterprise social network can subscribe to or follow a public record within the enterprise social network.

In some online enterprise social networks, users also can follow one another by establishing "links" or "connections" with each other, sometimes referred to as "friending" one another. By establishing such a link, one user can see information generated by, generated about, or otherwise associated with another user. For instance, a first user can see information posted by a second user to the second user's profile page. In one example, when the first user is following the second user, the first user's news feed can receive a post from the second user submitted to the second user's profile feed.

In some implementations, users can access one or more enterprise network feeds (also referred to herein simply as "feeds"), which include publications presented as feed items or entries in the feed. A network feed can be displayed in a graphical user interface (GUI) on a display device such as the display of a user's computing device as described above. The publications can include various enterprise social network information or data from various sources and can be stored in the database system 16, for example, in tenant database 22. In some implementations, feed items of information for or about a user can be presented in a respective user feed, feed items of information for or about a group can be presented in a respective group feed, and feed items of information for or about a record can be presented in a respective record feed. A second user following a first user, a first group, or a first record can automatically receive the feed items associated with the first user, the first group or the first record for display in the second user's news feed. In some implementations, a user feed also can display feed items from the group feeds of the groups the respective user subscribes to, as well as feed items from the record feeds of the records the respective user subscribes to.

The term "feed item" (or feed element) refers to an item of information, which can be viewable in a feed. Feed items can include publications such as messages (for example, user-generated textual posts or comments), files (for example, documents, audio data, image data, video data or other data), and "feed-tracked" updates associated with a user, a group or a record (feed-tracked updates are described in greater detail below). A feed item, and a feed in general, can include combinations of messages, files and feed-tracked updates. Documents and other files can be included in, linked with, or attached to a post or comment. For example, a post can include textual statements in combination with a document. The feed items can be organized in chronological order or another suitable or desirable order (which can be customizable by a user) when the associated feed is displayed in a graphical user interface (GUI), for instance, on the user's computing device.

Messages such as posts can include alpha-numeric or other character-based user inputs such as words, phrases, statements, questions, emotional expressions, or symbols. In some implementations, a comment can be made on any feed item. In some implementations, comments are organized as a list explicitly tied to a particular feed item such as a feed-tracked update, post, or status update. In some implementations, comments may not be listed in the first layer (in a hierarchal sense) of feed items, but listed as a second layer branching from a particular first layer feed item. In some implementations, a "like" or "dislike" also can be submitted in response to a particular post, comment or other publication.

A "feed-tracked update," also referred to herein as a "feed update," is another type of publication that may be presented as a feed item and generally refers to data representing an event. A feed-tracked update can include text generated by the database system in response to the event, to be provided as one or more feed items for possible inclusion in one or more feeds. In one implementation, the data can initially be stored by the database system in, for example, tenant database 22, and subsequently used by the database system to create text for describing the event. Both the data and the text can be a feed-tracked update, as used herein. In some implementations, an event can be an update of a record and can be triggered by a specific action by a user. Which actions trigger an event can be configurable. Which events have feed-tracked updates created and which feed updates are sent to which users also can be configurable. Messages and feed updates can be stored as a field or child object of a record. For example, the feed can be stored as a child object of the record.

As described above, a network feed can be specific to an individual user of an online social network. For instance, a user news feed (or "user feed") generally refers to an aggregation of feed items generated for a particular user, and in some implementations, is viewable only to the respective user on a home page of the user. In some implementations a user profile feed (also referred to as a "user feed") is another type of user feed that refers to an aggregation of feed items generated by or for a particular user, and in some implementations, is viewable only by the respective user and other users following the user on a profile page of the user. As a more specific example, the feed items in a user profile feed can include posts and comments that other users make about or send to the particular user, and status updates made by the particular user. As another example, the feed items in a user profile feed can include posts made by the particular user and feed-tracked updates initiated based on actions of the particular user.

As is also described above, a network feed can be specific to a group of enterprise users of an online enterprise social network. For instance, a group news feed (or "group feed") generally refers to an aggregation of feed items generated for or about a particular group of users of the database system 16 and can be viewable by users following or subscribed to the group on a profile page of the group. For example, such feed items can include posts made by members of the group or feed-tracked updates about changes to the respective group (or changes to documents or other files shared with the group). Members of the group can view and post to a group feed in accordance with a permissions configuration for the feed and the group. Publications in a group context can include documents, posts, or comments. In some implementations, the group feed also includes publications and other feed items that are about the group as a whole, the group's purpose, the group's description, a status of the group, and group records and other objects stored in association with the group. Threads of publications including updates and messages, such as posts, comments, likes, etc., can define conversations and change over time. The following of a group allows a user to collaborate with other users in the group, for example, on a record or on documents or other files (which may be associated with a record).

As is also described above, a network feed can be specific to a record in an online enterprise social network. For instance, a record news feed (or "record feed") generally refers to an aggregation of feed items about a particular record in the database system 16 and can be viewable by users subscribed to the record on a profile page of the record. For example, such feed items can include posts made by users about the record or feed-tracked updates about changes to the respective record (or changes to documents or other files associated with the record). Subscribers to the record can view and post to a record feed in accordance with a permissions configuration for the feed and the record. Publications in a record context also can include documents, posts, or comments. In some implementations, the record feed also includes publications and other feed items that are about the record as a whole, the record's purpose, the record's description, and other records or other objects stored in association with the record. Threads of publications including updates and messages, such as posts, comments, likes, etc., can define conversations and change over time. The following of a record allows a user to track the progress of that record and collaborate with other users subscribing to the record, for example, on the record or on documents or other files associated with the record.

In some implementations, data is stored in database system 16, including tenant database 22, in the form of "entity objects" (also referred to herein simply as "entities"). In some implementations, entities are categorized into "Records objects" and "Collaboration objects." In some such implementations, the Records object includes all records in the enterprise social network. Each record can be considered a sub-object of the overarching Records object. In some implementations, Collaboration objects include, for example, a "Users object," a "Groups object," a "Group-User relationship object," a "Record-User relationship object" and a "Feed Items object."

In some implementations, the Users object is a data structure that can be represented or conceptualized as a "Users Table" that associates users to information about or pertaining to the respective users including, for example, metadata about the users. In some implementations, the Users Table includes all of the users within an organization. In some other implementations, there can be a Users Table for each division, department, team or other sub-organization within an organization. In implementations in which the organization is a tenant of a multi-tenant enterprise social network platform, the Users Table can include all of the users within all of the organizations that are tenants of the multi-tenant enterprise social network platform. In some implementations, each user can be identified by a user identifier ("UserID") that is unique at least within the user's respective organization. In some such implementations, each organization also has a unique organization identifier ("OrgID").

In some implementations, the Groups object is a data structure that can be represented or conceptualized as a "Groups Table" that associates groups to information about or pertaining to the respective groups including, for example, metadata about the groups. In some implementations, the Groups Table includes all of the groups within the organization. In some other implementations, there can be a Groups Table for each division, department, team or other sub-organization within an organization. In implementations in which the organization is a tenant of a multi-tenant enterprise social network platform, the Groups Table can include all of the groups within all of the organizations that are tenants of the multitenant enterprise social network platform. In some implementations, each group can be identified by a group identifier ("GroupID") that is unique at least within the respective organization.

In some implementations, the database system 16 includes a "Group-User relationship object." The Group-User relationship object is a data structure that can be represented or conceptualized as a "Group-User Table" that associates groups to users subscribed to the respective groups. In some implementations, the Group-User Table includes all of the groups within the organization. In some other implementations, there can be a Group-User Table for each division, department, team or other sub-organization within an organization. In implementations in which the organization is a tenant of a multi-tenant enterprise social network platform, the Group-User Table can include all of the groups within all of the organizations that are tenants of the multitenant enterprise social network platform.

In some implementations, the Records object is a data structure that can be represented or conceptualized as a "Records Table" that associates records to information about or pertaining to the respective records including, for example, metadata about the records. In some implementations, the Records Table includes all of the records within the organization. In some other implementations, there can be a Records Table for each division, department, team or other sub-organization within an organization. In implementations in which the organization is a tenant of a multi-tenant enterprise social network platform, the Records Table can include all of the records within all of the organizations that are tenants of the multitenant enterprise social network platform. In some implementations, each record can be identified by a record identifier ("RecordID") that is unique at least within the respective organization.

In some implementations, the database system 16 includes a "Record-User relationship object." The Record-User relationship object is a data structure that can be represented or conceptualized as a "Record-User Table" that associates records to users subscribed to the respective records. In some implementations, the Record-User Table includes all of the records within the organization. In some other implementations, there can be a Record-User Table for each division, department, team or other sub-organization within an organization. In implementations in which the organization is a tenant of a multi-tenant enterprise social network platform, the Record-User Table can include all of the records within all of the organizations that are tenants of the multitenant enterprise social network platform.

In some implementations, the database system 16 includes a "Feed Items object." The Feed items object is a data structure that can be represented or conceptualized as a "Feed Items Table" that associates users, records and groups to posts, comments, documents or other publications to be displayed as feed items in the respective user feeds, record feeds and group feeds, respectively. In some implementations, the Feed Items Table includes all of the feed items within the organization. In some other implementations, there can be a Feed Items Table for each division, department, team or other sub-organization within an organization. In implementations in which the organization is a tenant of a multi-tenant enterprise social network platform, the Feed Items Table can include all of the feed items within all of the organizations that are tenants of the multitenant enterprise social network platform.

Enterprise social network news feeds are different from typical consumer-facing social network news feeds (for example, FACEBOOK®) in many ways, including in the way they prioritize information. In consumer-facing social networks, the focus is generally on helping the social network users find information that they are personally interested in. But in enterprise social networks, it can, in some instances, applications, or implementations, be desirable from an enterprise's perspective to only distribute relevant enterprise-related information to users and to limit the distribution of irrelevant information. In some implementations, relevant enterprise-related information refers to information that would be predicted or expected to benefit the enterprise by virtue of the recipients knowing the information, such as an update to a database record maintained by or on behalf of the enterprise. Thus, the meaning of relevance differs significantly in the context of a consumer-facing social network as compared with an employee-facing or organization member-facing enterprise social network.

In some implementations, when data such as posts or comments from one or more enterprise users are submitted to a network feed for a particular user, group, record or other object within an online enterprise social network, an email notification or other type of network communication may be transmitted to all users following the respective user, group, record or object in addition to the inclusion of the data as a feed item in one or more user, group, record or other feeds. In some online enterprise social networks, the occurrence of such a notification is limited to the first instance of a published input, which may form part of a larger conversation. For instance, a notification may be transmitted for an initial post, but not for comments on the post. In some other implementations, a separate notification is transmitted for each such publication, such as a comment on a post.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

Figure 10:
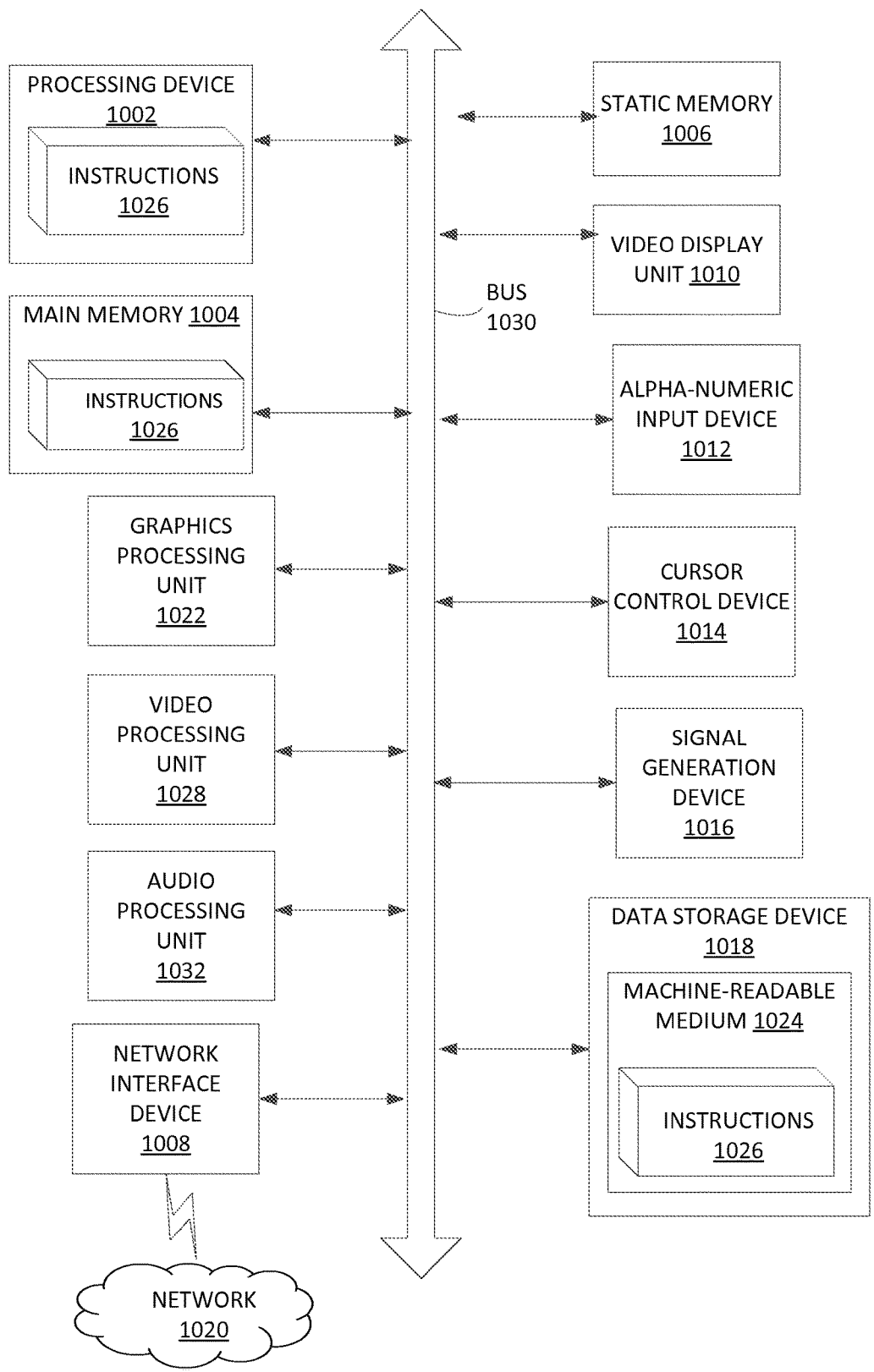
FIG. 10 illustrates a block diagram of an embodiment of a computer system in which some embodiments of the disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein.

The computer system 1000 may further include a network interface device 608 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a computer-readable medium) on which is stored one or more sets of instructions or software 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In one implementation, the instructions 1026 include instructions to implement functionality corresponding to a server function module (e.g., server function module 121 or 200 of FIG. 1 or 2). While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    receiving, from a client system, a request associated with a plurality of functions that are provided by a server;
    identifying, by a processing device, a subset of functions of the plurality of functions that are provided by the server and that are available based on the request;
    receiving, from the client system, a selection of one or more of the identified subset of functions that are provided by the server and that are available based on the request; and
    transmitting information identifying an operation of the selected one or more of the identified subset of functions to the client system.

2. The method of claim 1, further comprising:
    generating description information associated with the operation for the selected one or more of the identified subset of functions; and transmitting the description information to the client system.

3. The method of claim 2, wherein the description information identifies inputs and outputs for each of the selected one or more functions of the identified subset of functions.

4. The method of claim 1, further comprising:
identifying an access permission associated with the client system, wherein the identifying of the subset of functions is based on the access permissions associated with the client system satisfying a condition associated with the subset of functions.

5. The method of claim 1, further comprising:
receiving programming code corresponding to a new function to be provided by the server.

6. The method of claim 5, further comprising:
receiving a second request associated with the plurality of functions that are provided by the server;
identifying a second subset of functions of the plurality of functions that are provided by the server and that are available based on the request; and
generating second information based on the identified second subset of functions, wherein the second subset of functions comprises the new function and the first subset of functions.

7. The method of claim 5, further comprising:
standardizing a feature of the new function to be provided by the server, wherein the feature corresponds to an error message associated with the new function.

8. A system comprising:
a memory; and
a processing device operatively coupled with the memory and to:
receive, from a client system, a request associated with a plurality of functions that are provided by a server;
identify a subset of functions of the plurality of functions that are provided by the server and that are available based on the request;
receive, from the client system, a selection of one or more of the identified subset of functions that are provided by the server and that are available based on the request; and
transmit information identifying an operation of the selected one or more of the identified subset of functions to the client system.

9. The system of claim 8, wherein the processing device is further to:
generate description information associated with the operation for the selected one or more of the identified subset of functions; and
transmit the description information to the client system.

10. The system of claim 9, wherein the description information identifies inputs and outputs for each of the selected one or more functions of the identified subset of functions.

11. The system of claim 8, wherein the processing device is further to:
identify an access permission associated with the client system, wherein the identifying of the subset of functions is based on the access permissions associated with the client system satisfying a condition associated with the subset of functions.

12. The system of claim 8, wherein the processing device is further to:
receive programming code corresponding to a new function to be provided by the server.

13. The system of claim 12, wherein the processing device is further to:
receive a second request associated with the plurality of functions that are provided by the server;
identify a second subset of functions of the plurality of functions that are provided by the server and that are available based on the request; and
generate second information based on the identified second subset of functions, wherein the second subset of functions comprises the new function and the first subset of functions.

14. The system of claim 12, wherein the processing device is further to:
standardize a feature of the new function to be provided by the server, wherein the feature corresponds to an error message associated with the new function.

15. A non-transitory computer readable medium including data that, when accessed by a processing device, cause the processing device to perform operations comprising:
receiving, from a client system, a request associated with a plurality of functions that are provided by a server;
identifying a subset of functions of the plurality of functions that are provided by the server and that are available based on the request;
receiving, from the client system, a selection of one or more of the identified subset of functions that are provided by the server and that are available based on the request; and
transmitting information identifying an operation of the selected one or more of the identified subset of functions to the client system.

16. The non-transitory computer readable medium of claim 15, the operations further comprising:
generating description information associated with the operation for the selected one or more of the identified subset of functions; and
transmitting the description information to the client system.

17. The non-transitory computer readable medium of claim 16, wherein the description information identifies inputs and outputs for each of the selected one or more functions of the identified subset of functions.

18. The non-transitory computer readable medium of claim 15, the operations further comprising:
receiving programming code corresponding to a new function to be provided by the server.

19. The non-transitory computer readable medium of claim 18, the operations further comprising:
receiving a second request associated with the plurality of functions that are provided by the server;
identifying a second subset of functions of the plurality of functions that are provided by the server and that are available based on the request; and
generating second information based on the identified second subset of functions, wherein the second subset of functions comprises the new function and the first subset of functions.

20. The non-transitory computer readable medium of claim 18, the operations further comprising:
standardizing a feature of the new function to be provided by the server, wherein the feature corresponds to an error message associated with the new function.

* * * * *